W. Stinson,
Horse Rake

No. 85869.  Patented Jan. 12. 1869.

Witnesses.
John J. Chew
J. D. Peyton

Inventor
William Stinson
by his Attorney
S. S. Fahnestock

WILLIAM STINSON, OF COOLSPRING TOWNSHIP, PENNSYLVANIA.

Letters Patent No. 85,869, dated January 12, 1869.

IMPROVEMENT IN HORSE-RAKES.

The Schedule referred to in these Letters Patent and making part of the same.

*To all whom it may concern:*

Be it known that I, WILLIAM STINSON, of Coolspring township, in the county of Mercer, and State of Pennsylvania, have invented a new and useful Improvement in Hay-Rakes, of which the following is a full, clear, and exact description, reference being had to the annexed drawing of the same, making part of this specification, and in which—

Figure 1:
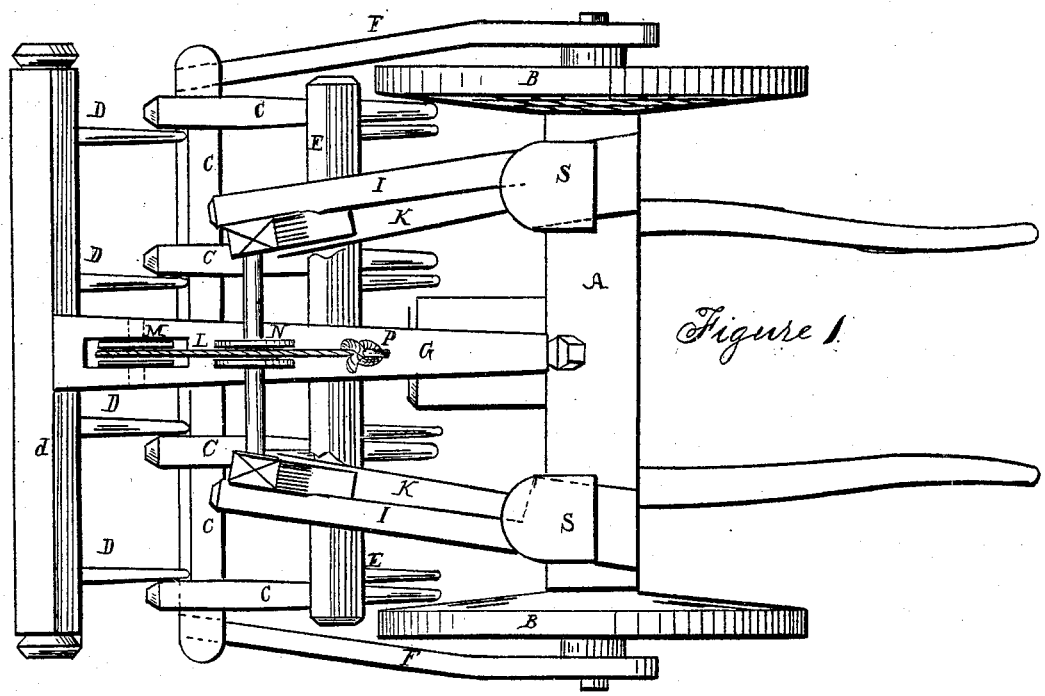
Figure 1 represents a plan or top view of a rake embracing my improvements.
Figure 2:
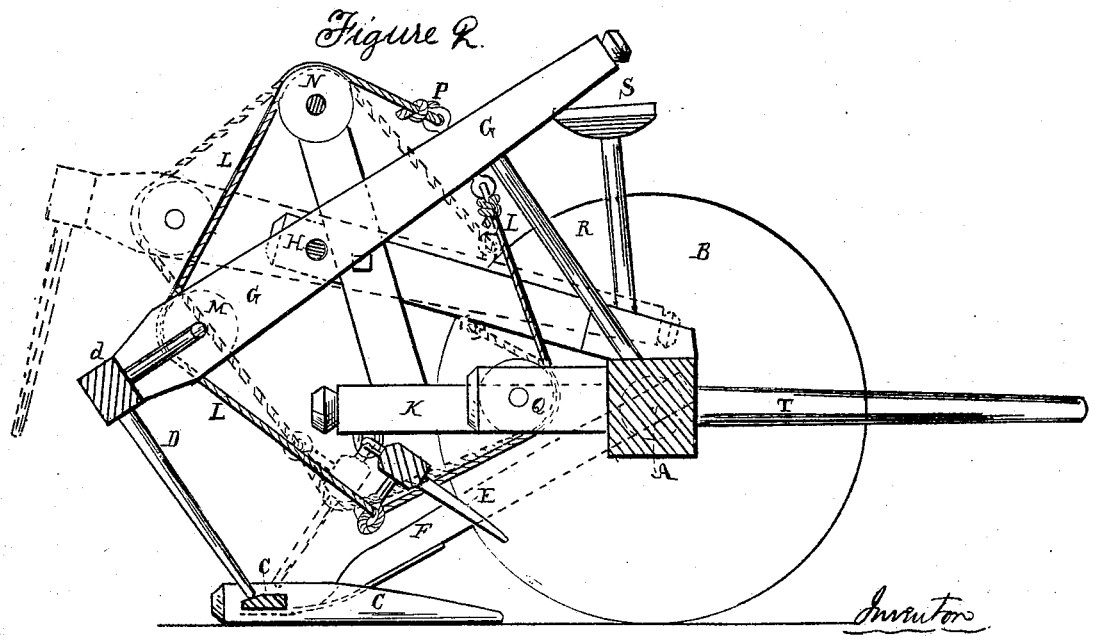
Figure 2 represents a vertical section of the same, the rakes being shown respectively in the positions for raking and gathering a load of hay, and for discharging the same in a bundle on the ground.

The supporting-frame of my improved rake consists of an axle, A, and wheels, B B, like those of a common cart.

The raking-mechanism consists of a horizontal gathering-rake, C, an inclined vertically-moving rake, D, and a hinged discharging-rake, E, constructed, arranged, and operating in the following manner:

The rake C is made of a series of teeth, secured to a rake-head, c, so as to lie flat upon the ground like guard-fingers in a mowing-machine. Each end of this rake-head c is secured to an arm, F, which extends up and is hinged to the axle in such a manner as to allow the rake to rise and fall, to conform to the surface of the ground. This rake rests flat upon the ground, for the double purpose of gathering the hay upon its fingers, and of forming a bottom or seat to support it while gathering a load.

The rake D is arranged in the rear of the rake C, inclining upward and rearward, so that its teeth rest upon the cross-head c of the rake C, while the cross-head d of the rake D is connected to a lever, G, extending upward and frontward above the axle, so as to be within reach of an attendant.

This lever G is supported, near the middle of its length, by a fulcrum-pin, H, in the ends of two arms I I, extending rearward and upward from the axle.

The rake D thus arranged, forms a back to the horizontal rake C, and constitutes, as it were, a crib, within which the load of hay is gathered by the horizontal rake.

This arrangement of the rake D allows it to be raised and lowered to open a space between it and the ground-rake, for the purpose of discharging the load of hay, and again resuming its connection with the lower rake.

This motion of the rake is effected by the driver, or an attendant, by pressing the front end of the lever down by a quick motion.

To simply separate the connection of the rake D from the rake C, will not effect the discharge of the load. In order, therefore, to accomplish this, I arrange the rake E above the fingers of the gathering-rake, and connect it, by hinges J, to two horizontal arms K, extending rearward from the axle, so that the teeth, in moving back, will sweep the teeth of the gathering-rake, and thus press the load from the rake, and discharge it at the rear.

In doing this, however, the two rakes must act in unison and simultaneously. This is effected by connecting the two rakes together, so that the motion of one produces that of the other.

The hinged discharging-rake E is connected to a cord, L, which extends round a pulley, M, in the rear end of the lever G, and over a pulley, N, and secured to the front end of the lever at P, while the other end of said cord extends from the front side of the rake E, round a pulley, Q, and is connected to the lever, at or near the point of connection of the front end, so that the lifting and discharging-rakes being thus connected, the motion of one controls the other; and hence, when the rake D is elevated to open a space between the two rakes, the rake E is forced rearward against the hay accumulated upon the rake, and discharges it in the rear in a bundle upon the ground. The rake D, by its own weight, then resumes its position upon the rake C, to form the crib for the accumulation of another load.

The hay is gathered and discharged in loads as the rake advances over the ground.

In discharging the load, the rear rake is elevated by the lower a sufficient distance above the lower rake, and the rake E at the same time is moved back in the arc of a circle, so that its teeth will move against and push off the load. The descent of the rear rake turns the discharging-rake forward, so that its teeth remain elevated above the lower rake during the operation of gathering a load.

In order to lock the rake D in its position upon the lower rake, while gathering a load, I place an arm, R, upon the axle, so as to extend beneath the lever, and hold its front end up and its rear end down. When the load is to be discharged, the lever is relieved from its support R, having sufficient lateral motion for that purpose.

The pulleys which sustain the connecting-cord of the rakes, are arranged in a triangular form, one being above the lever, and one beneath it, and these pulleys are sustained by arms projecting from the axle.

Seats or stands S are erected upon the axle for the driver and attendant, and the rake is drawn by shafts T.

I claim the arrangement of the horizontal gathering-rake C, the rear vertically-vibrating rake D, and the front discharging-rake E, the whole connected and operating substantially as described.

WM. STINSON.

Witnesses:
WM. STEWART,
A. S. BURWELL.